United States Patent
Price

(10) Patent No.: US 8,118,202 B1
(45) Date of Patent: Feb. 21, 2012

(54) PICKUP BED CARGO ATTACHMENT BRACKET

(76) Inventor: Brent A. Price, Colorado Springs, CO (US)

( * ) Notice: Subject to any disclaimer, the term of this patent is extended or adjusted under 35 U.S.C. 154(b) by 189 days.

(21) Appl. No.: 12/322,928

(22) Filed: Feb. 9, 2009

Related U.S. Application Data

(60) Provisional application No. 61/027,313, filed on Feb. 8, 2008.

(51) Int. Cl.
*B60R 7/00* (2006.01)
*B60P 7/08* (2006.01)
(52) U.S. Cl. ......... 224/403; 224/555; 224/568; 224/924
(58) Field of Classification Search ................... 224/403, 224/420, 924, 555–558, 560, 561, 568, 570; 410/101, 102, 104, 106, 110
See application file for complete search history.

(56) References Cited

U.S. PATENT DOCUMENTS

| | | | | |
|---|---|---|---|---|
| 4,934,572 A * | 6/1990 | Bowman et al. | ............... | 224/558 |
| 5,037,019 A * | 8/1991 | Sokn | ............................. | 224/558 |
| 5,127,564 A * | 7/1992 | Romero | ........................ | 224/403 |
| 5,395,018 A * | 3/1995 | Studdiford | .................... | 224/420 |
| 5,560,576 A * | 10/1996 | Cargill | ..................... | 248/231.61 |
| 5,836,490 A * | 11/1998 | Price | .............................. | 224/403 |
| 6,039,520 A * | 3/2000 | Cheng | ........................... | 410/106 |
| 6,196,777 B1 * | 3/2001 | Price | ............................. | 410/102 |
| 6,604,898 B2 * | 8/2003 | Price | ............................. | 410/102 |
| 6,988,645 B1 * | 1/2006 | Nusbaum et al. | ............. | 224/519 |
| 7,025,524 B2 * | 4/2006 | Vitoorapakorn et al. | .. | 403/408.1 |
| 7,080,966 B2 * | 7/2006 | Roh | ............................... | 410/102 |
| 7,125,194 B2 * | 10/2006 | Vitoorapakorn et al. | ...... | 403/373 |
| 2001/0002973 A1 * | 6/2001 | Price | ............................. | 410/106 |

* cited by examiner

*Primary Examiner* — Justin Larson
*Assistant Examiner* — Corey Skurdal
(74) *Attorney, Agent, or Firm* — G. F. Gallinger

(57) ABSTRACT

A cargo attachment bracket to be carried on an interior bed rail extending parallel to, and spaced down from, a top portion of a side of a pickup truck bed, comprising: a) a body having a front face, a rear face juxtaposed against the interior rail, and an opening extending between the front and rear face; b) a screw having a head portion, a shank portion extending through the opening between the front and rear face, and a lug for engagement within, and under an interior side portion of the rail for releasable attachment of the body to a chosen position along the length of the rail; c) an arm having a bracket end, and an opposite inwardly projecting end; d) an arm extension projecting from the unhinged end portion of the arm, configured together with the arm, and provided with selection and locking means for selection and lockably fixing the combined projection of the arm and the extension from the rail; and, e) a releasable cargo attachment end portion carried by the unattached end of the arm extension. The cargo is attached to the cargo end portion and is releasably held a selected projected length from the rail.

18 Claims, 3 Drawing Sheets

US 8,118,202 B1

PICKUP BED CARGO ATTACHMENT BRACKET

PRIOR APPLICATION

This application claims the priority of U.S. Provisional Patent Application No. 61/027,313 filed Feb. 8, 2008.

FIELD OF THE INVENTION

This invention relates to cargo attachment brackets used to secure cargo in the bed of a pickup truck. More particularly this invention relates to a bracket which universally attaches to the rail in the interior side wall of the bed, said rails being provided in varying configurations by all truck manufacturers. The cargo attachment bracket has particular utility to carry a bicycle.

BACKGROUND OF THE INVENTION

U.S. Pat. No. 6,196,777 was issued on Mar. 6, 2001 to Brent A. Price for a vehicular cargo anchor. U.S. Pat. No. 6,604,898 was issued on Aug. 12, 2003 to Brent A. Price for an anchor for bicycles and other cargo in an open bed pickup. Since the time of these anchors several truck manufacturers have added tie-down rails under the rail edge of the pickup bed. The depths of truck beds vary. Between different manufacturers the spacings of the tie-down rails vary both laterally from the top interior edge, and vertically beneath the top edge of the bed wall. When a bed cap is carried on the pickup bed an even greater lateral adjustment is required. In this disclosure Brent A. Price improves his earlier design by allowing for both height and lateral adjustment, to thereby accommodate and facilitate exploitation of any variation of manufacturer equipped pickup bed rails. Sufficient lateral adjustment is provided in the cargo clamp so that even varying thicknesses of pickup bed caps can be accommodated.

Most individuals only need to carry long cargo such as a bicycle, ladder, or skiis infrequently. An unused cargo rack or other large attachment paraphernalia which projects above or into the truck bed is generally considered detrimental in appearance. Yet when the rack is needed, not only unquestionably safe operation, but convenience is demanded. One of the solutions to this problem is an apparatus which can be conveniently moved from a generally hidden storage position to a more conspicuous in use position. Additionally, an apparatus which is minimal in size is minimally seen. An unused minimally sized apparatus minimally detracts from both mileage and hauling capacity for alternate loads. Another strong preference of both manufacturers and suppliers is that the apparatus have universal application. This facilitates not only ordering specification, but longer production runs as well as minimal inventory.

This invention discloses a pickup bed cargo attachment bracket which has a uniquely effective design. Varying lateral and vertical spacing requirements are accommodated. The tie down arm swings from a generally hidden storage position, to an operable position. The bracket is convenient to adjust and use. The bracket is uncannily small and effective. The unobtrusive size, and ability to swing to a storage position ensures the bracket does not obstruct the space within the bed box while not in use. The bracket universally fits the factory equipped bed rails in all pickup trucks.

OBJECTS OF THE INVENTION

It is an object of this invention to disclose a pickup bed cargo attachment bracket which can attach to the pickup bed rails provided by truck manufacturers. It is an object of this invention to disclose a single pickup bed cargo attachment bracket which can universally accommodate the varying spacings in the pickup bed rails provided by truck manufacturers. It is an object of this invention to disclose a pickup bed cargo attachment bracket which has sufficient lateral adjustment to accommodate even the varying thicknesses of pickup bed caps so that the cargo clamp can be used together with a bed cap on a pickup. It is yet a further object of this invention to disclose a pickup bed cargo attachment bracket which is not only safe and effective, but convenient to use. It is yet a further object of this invention to disclose a pickup bed cargo attachment bracket which is minimally obtrusive when not in use, not only because of its minimal size, but additionally because of its swing away design. A pickup bed cargo attachment bracket which is sufficiently visually and practically unobtrusive to other cargo when not in use and need only be swung into an operable position is substantially more convenient than a bracket which must be removed.

One aspect of this invention provides for a cargo attachment bracket to be carried on an interior bed rail extending parallel to, and spaced down from, a top portion of a side of a pickup truck bed, comprising: a) a body having a front face, a rear face juxtaposed against the interior rail, and an opening extending between the front and rear face; b) a screw having a head portion, a shank portion extending through the opening between the front and rear face, and a lug for engagement within, and under an interior side portion of the rail for releasable attachment of the body to a chosen position along the length of the rail; c) an arm having a bracket end, and an opposite inwardly projecting end; d) an arm extension projecting from the unhinged end portion of the arm, configured together with the arm, and provided with selection and locking means for selection and lockably fixing the projection of the arm and the extension from the rail; and, e) a releasable cargo attachment end portion carried by the unattached end of the arm extension. The cargo is attached to the cargo end portion and is releasably held a selected projected length from the rail.

In another aspect of this invention a broad method of attaching a bicycle in the bed of a pickup truck having a rail running along an interior side of the bed comprising the steps of: a) obtaining two brackets as described in claim 1; b) spacing a front and rear bracket positioned along the rail for attachment of a front and rear portion of the frame of the bicycle thereto; c) positioning the shank portion of the screws through the body of the bracket adjacent to the interior side of the rail, with the lug positioned in the rail screwed on an end portion of the shank; d) mounting the brackets by tightening the screws extending through the body of the brackets, thereby squeezing the rail between the lug and the body of the brackets; e) extending and locking the arm, and arm extension to position each attachment end portion at an appropriate spacing from the interior side wall of the truck bed; and finally, f) attaching the front and rear frame of the bicycle to the two attachment brackets.

Various other objects, advantages and features of this invention will become apparent to those skilled in the art from the following description in conjunction with the accompanying drawings.

FIGURES OF THE INVENTION

FIG. 3 shows a tie down rail which is a channel spaced down from, a top portion of a side of a pickup truck bed.

Figure 1:
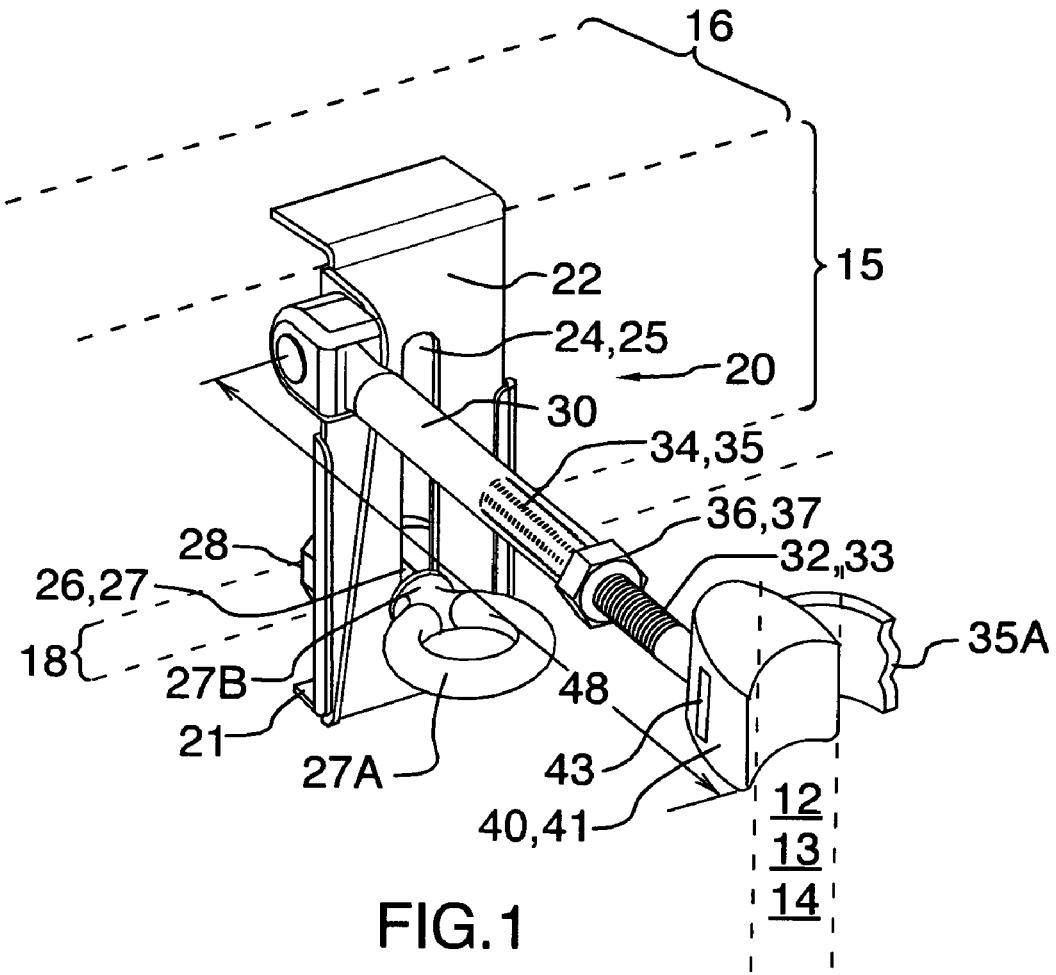
FIG. 1 is a perspective view of a pickup bed cargo attachment bracket.
Figure 4:
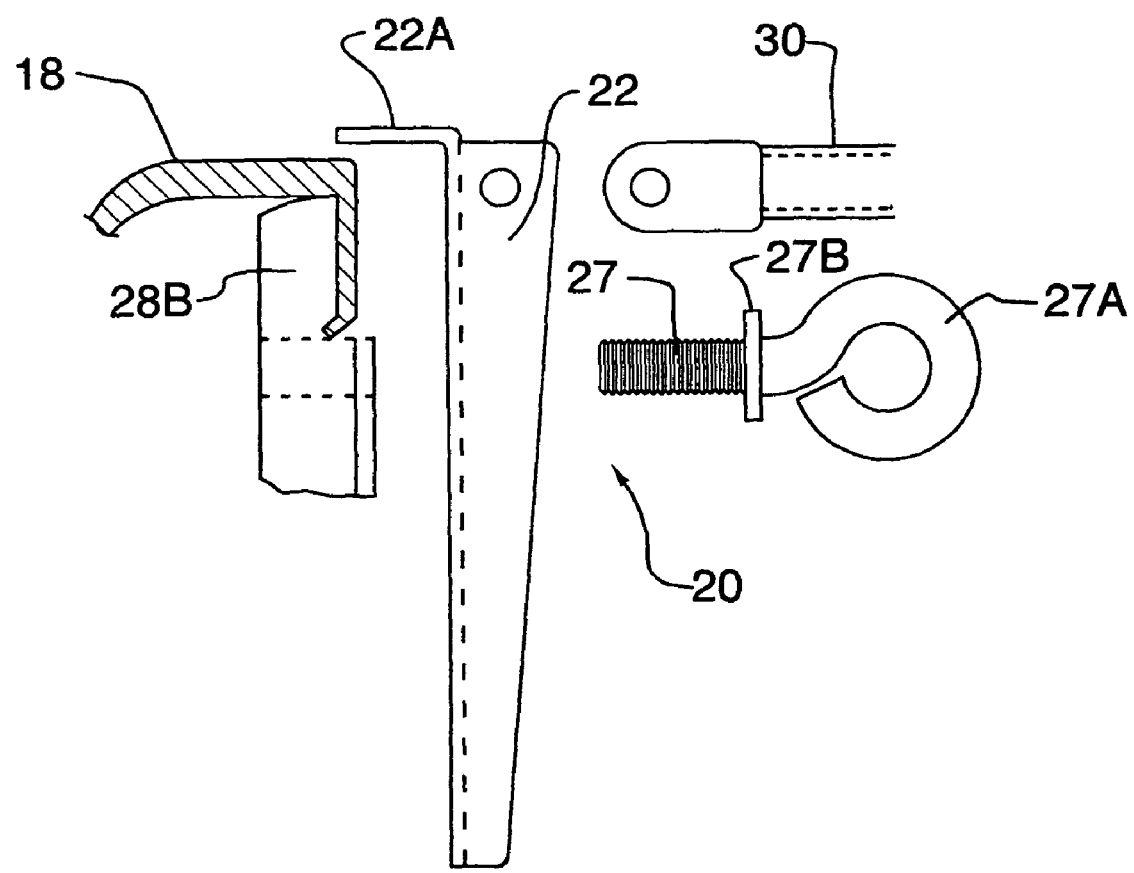

FIG. 4 is a partial cross sectional view of the pickup bed cargo attachment bracket similar to that shown in FIG. 1. FIG. 4 shows the bracket adapted for a pickup truck which does not have having a top rail which is a channel spaced down from, a top portion of a side of the pickup truck bed. FIG. 4 is included to show that the same bracket can be accommodated to anchor to a top rail with a brace adapted to squeeze against an interior top side portion of the pickup truck bed.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a pickup bed cargo attachment bracket 20. Most generally a cargo attachment bracket 20 is anchored on an interior bed rail 18 extending parallel to, and spaced down from, a top portion of a side of a pickup truck bed 16, comprises: a) a body 22 having a front face, a rear face juxtaposed against the interior rail 18, and an opening 24 extending between the front and rear face; b) a screw 26 having a head portion, a shank portion extending through the opening 24 between the front and rear face, and a lug 28 for engagement within, and under an interior side portion of the rail 18 for releasable attachment of the body 22 to a chosen position along the length of the rail 18; c) an arm 30 having a bracket end, and an opposite inwardly projecting end; d) an arm extension 32 projecting from the unhinged end portion of the arm 30, configured together with the arm 30, and provided with selection means 34 and locking means 36 for selection and lockably fixing the combined projection of the arm 30 and the arm extension 32 from the rail 18; and, e) a releasable cargo attachment end portion 40 carried by the unattached end of the arm extension 32. The cargo 14 is attached to the cargo end portion 40 and is releasably held as selected projected length 48 from the rail 18.

In a preferred embodiment the body 22 of the cargo attachment bracket 20 is vertically elongate and extends up to and over the top portion of the side of the pickup truck bed 16. The opening 24 between the front and rear face comprises a vertical slot 25 to thereby accommodate different pickup trucks having different spacings between the rail 18 and the top portion of the side of the pickup truck bed 16. In the most preferred embodiment of the invention the screw 26 comprises an eyebolt 27, having an eye head portion 27A which can be finger held, tightened, and used as a tie down. When the screw 26 is an eye bolt 27 a flat washer 27B, positioned over the shank 27C, immediately behind the eye head portion 27A is provided to ensure that when the eye head portion 27A is vertically aligned, the eye head portion 27A does not drop into the vertical slot 25.

In the most preferred embodiment of the invention the bracket end of the arm 30 is hinged to the body 22, and configured to swing between an inwardly extending position and a downward storage position adjacent to the body 22. After the cargo 14 is detached from the cargo attachment end portion 40, the arm 30 and arm extension 32 together can pivot downwardly to a storage position adjacent to the bracket body 22. In the most preferred embodiment of the invention the arm 30, the arm extension 32, and the selection means 34 and locking means 36 comprise a hollow internally threaded member 35 having a mating externally threaded rod 33 therein, said rod 33 carrying a nut 37 thereon for locking the spacing between the attachment end portion 40 and rail 18 after a selected projected length 48 has been attained by rotating the arm extension 32 with respect to the arm 30.

Figure 2:
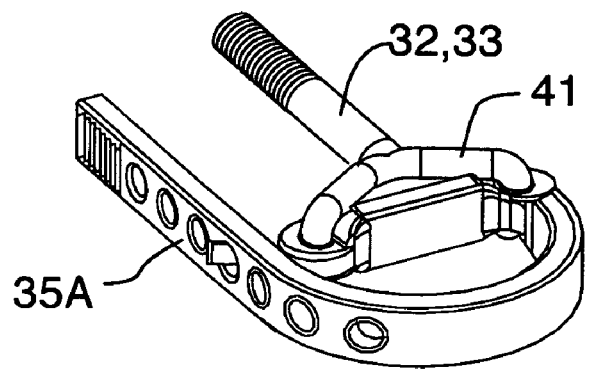
FIG. 2 is a perspective view of an alternative embodiment of a cargo attachment bracket extension arm and strap.

Most preferably the releasable cargo attachment end portion 40 carried by the unattached end of the arm extension 32 comprises a yolk 41 having a strap slot 43 therethrough. In a preferred embodiment of the invention the yolk 41 is molded from rubber and contoured with a radius chosen for the reception of a bicycle frame 13. FIG. 2 is a perspective view of an alternative embodiment of a cargo attachment bracket extension arm 32 and strap 33A. FIG. 2 similarly shows a yolk 41 comprising a rod 33 to which the strap 33A is attached through holes therein.

Figure 3:
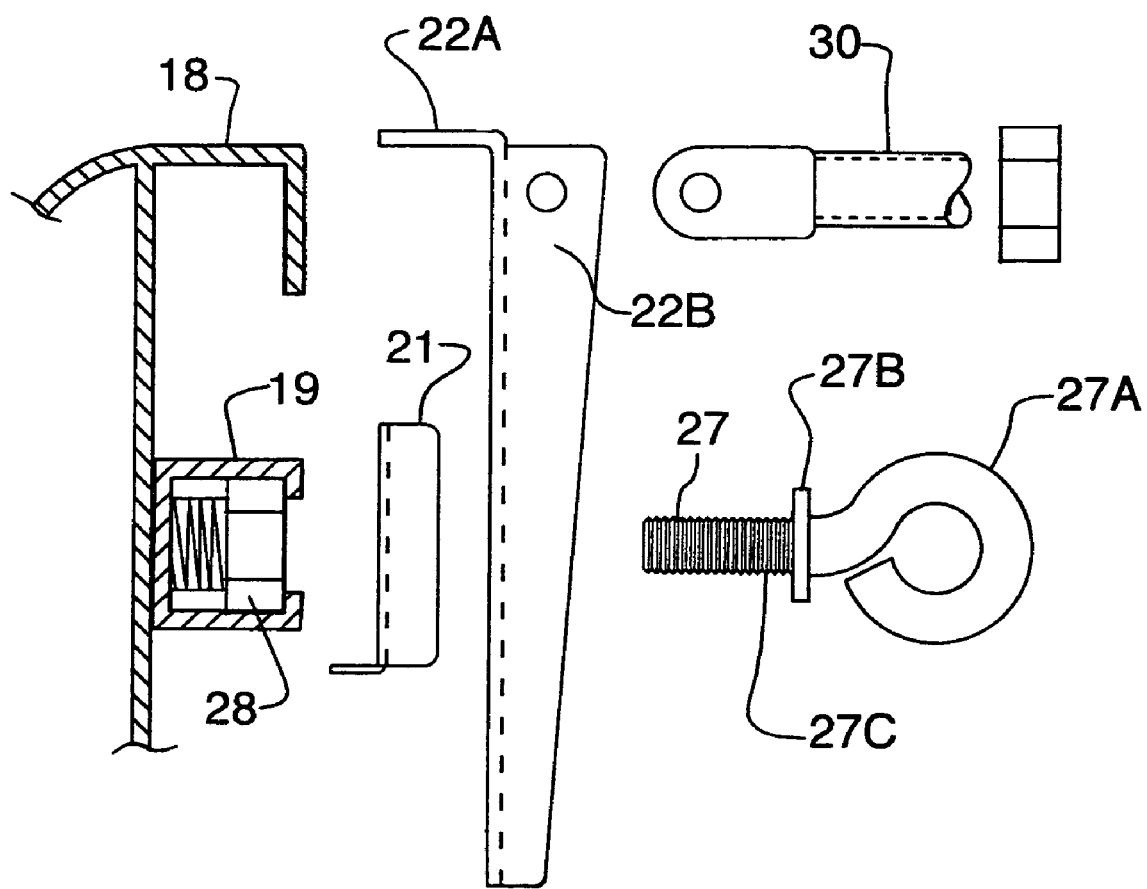
FIG. 3 is a partial cross sectional view of the pickup bed cargo attachment bracket shown in FIG. 1.

FIG. 3 is a partial cross sectional view of the pickup bed cargo attachment bracket 20 shown in FIG. 1. FIG. 3 shows a tie down rail 18 which is a channel 19 spaced down from, a top portion of a side of a pickup truck bed 16. In the most preferred embodiment of the invention the cargo attachment bracket 20 has a body 22 which is fabricated from flat metal having a top portion 22A bent to extend over the top portion of the side of the pickup truck bed 18, and having a side portion 22B bent to hingably attach the bracket end of the arm 30 thereto. In a preferred embodiment of the invention the cargo attachment bracket 20 further comprises a stabilization plate 21, positioned adjacent to one of the sides of the body 22, and having a central opening therethrough for reception of the shank of the screw 26 used to tighten and hold the body 22 against the channel 19. The stabilization plate 21 is provided for rigidity especially when the channel 19 is spaced substantially below the top side portion of the side of the pickup truck bed 16.

Most preferably the lug 28 is rectangular having a width which is able to be received through the channel 19 from an inner side portion thereof and a length which can be turned upright within the channel 19 to thereby vertically catch the top and bottom inner side portions of the channel 19.

FIG. 4 is a partial cross sectional view of the pickup bed cargo attachment bracket 20 similar to that shown in FIG. 1. FIG. 4 shows the bracket 20 adapted for a bed of a pickup truck 15 which does not have having a top rail 18 which is a channel 19 and spaced down from, a top portion of a side of the pickup truck bed 16. FIG. 4 is included to show that the same bracket 20 can be accommodated to anchor to a top rail 18 with a brace 28B adapted to squeeze against an interior top corner portion 17 of the pickup truck bed 15. Brace 28B is used in lieu of lug 28. Lug 28 is only used to squeeze a rail 18 spaced down from the top portion of a side of the pickup truck bed 18.

Most generally a cargo attachment bracket 20 to be carried on, and anchored to a top corner portion 17 of a pickup truck bed 15, comprises: a) a body 20 having a front face, a rear face juxtaposed against the top portion of the interior side of the pickup truck bed 16, and an opening 24 extending between the front and rear face; b) a screw 26 having a head portion, a shank portion extending through the opening 24 between the front and rear face, and a brace 28B adapted to be positioned under, and squeeze against an interior top side corner portion 17 of the pickup truck bed 15 to thereby releasably attach the body 22 to a chosen position along the length thereof; c) an arm 30 having a bracket end, and an opposite inwardly projecting end; d) an arm extension 32 projecting from the unhinged end portion of the arm 30, configured together with the arm 30, and provided with selection means 34 and locking means 36 for selection and lockably fixing the combined projection of the arm 30 and the extension 32 from the rail 18; and, e) a releasable cargo attachment end portion 40 carried by the unattached end of the arm extension 32. Cargo 14 attached to the cargo end portion 40 is releasably held a selected projected length 48 from the rail 18. This general description of the cargo attachment bracket 20 can be narrowed by specifying details similar to those specified above. In the most preferred embodiment of the invention the brace 28B has a central rectangular inward projection 29, to ensure maintenance of proper upright orientation of the brace 28B within the vertical slot 25.

A broad method of attaching a bicycle 12 in the bed of a pickup truck 15 having a rail 18 running along an interior side of the bed 15 comprises the steps of: a) obtaining two brackets 20 as most generally described above; b) spacing a front and rear bracket 20 positioned along the rail 18 for attachment to a front and rear portion of the bicycle frame 13 thereto; c) positioning the shank portion of the screws 26 through the body 22 of the bracket 20 adjacent to the interior side of the rail 18, with the lug 28 positioned in the rail 18 and screwed on to an end portion of the shank 27C; d) mounting the brackets 20 by tightening the screws 26 extending through the body 22 of the brackets 20, thereby squeezing the rail 18 between the lug 28 and the body 22 of the brackets 20; e) extending and locking the arm 30, and arm extension 32 to position each attachment end portion 40 at an appropriate spacing from the rail 18; and finally, f) attaching the front and rear bicycle frame 13 to the two attachment brackets 20.

This broad method specified above is narrowed if the screw 26 in the brackets 20 obtained comprise an eye bolt 27. The steps then further comprise: mounting each bracket 20 having a top portion 22A of the body 22 of each bracket 20 positioned on the top portion of the side of the pickup t%åck bed 18; and, hand tightening the eye bolts 27 thereby squeezing the rail 18 between the flat washer 27B under the eye head portion 27A of the eye bolt 27 and the lug 28, said shank portion 27C extending through the vertical slot 25.

The method can yet be further narrowed if the arm 30, the arm extension 32, and the selection means 34 and locking means 36 thereof comprise a hollow internally threaded member 35 having a mating externally threaded rod 33 therein, said rod 33 carrying a nut 37 thereon for lockably 36 selecting a selected projected length 48. The steps then further comprise: adjusting the spacing of the cargo attachment end portion 40 to an appropriate spacing from the rail 18 by rotating the extension arm 32 within the arm 30, and then tightening the nut 37 on the threaded rod 33 against the hollow internally threaded member 35 to lock the selected projected length 48; positioning straps 35A through the releasable cargo attachment end portion 40 and around the bicycle frame 13; swinging the arms 30 and the arm extensions 32 from an upright storage position to a lateral operable position; and thereafter, tightening the straps 35A to thereby secure the bicycle 12.

While the invention has been described with preferred specific embodiments thereof, it will be understood that this description is intended to illustrate and not to limit the scope of the invention, which is defined by the following claims.

I claim:

1. A bicycle attachment bracket to be carried on, and anchored to a top corner portion of a pickup truck bed, comprising:

a) a body having a front face, a rear face juxtaposed against a top portion of an interior side of the pickup truck bed, and an opening extending between the front and rear face;

b) a screw having a head portion, a shank portion extending through the opening between the front and rear face, and a lug adapted to attach to an interior top side corner portion of the pickup truck bed to thereby releasably attach the body to a chosen position along the length thereof;

c) an arm having a bracket end, hingably attached to the bracket, and an opposite inwardly projecting end;

d) a releasable bicycle attachment end portion carried by an unattached end of the arm;

so that a bicycle attached to the bicycle attachment end portion can be releasably held at a selected projected distance from a side of the pickup truck, thereby enabling a bicycle to be carried in an upright position along an inside of a projecting wheel cover within the pickup truck bed;

and so that when a bicycle is not being carried the arm can be conveniently folded down to a storage position, adjacent the bracket body, thereby facilitating full and unobstructed use of the pickup truck bed for other cargo.

2. A bicycle attachment bracket as in claim 1 wherein the lug is adapted for engagement within, and under an interior side portion of the rail for releasable attachment of the body to a chosen position along the length of the rail.

3. A bicycle attachment bracket as in claim 2 wherein the bracket body is vertically elongate and extends up to and over the top portion of a side of the pickup truck bed, and wherein the opening between the front and rear face comprises a vertical slot to thereby accommodate different pickup trucks having different spacings between the rail and the top portion of the side of the pickup truck bed.

4. A bicycle attachment bracket as in claim 3 wherein the screw comprises an eyebolt, having an eye head portion which can be finger held, tightened, and used as a tie down; and further comprising a flat washer positioned over the shank, immediately behind the eye head portion to ensure that when the eye head portion is vertically aligned that it does not drop into the vertical slot.

5. A bicycle attachment bracket as in claim 1 further comprising an arm extension projecting from the inwardly projecting end of the arm, configured together with the arm, and provided with selection and locking means for selection and lockably fixing a combined projection of the arm and the extension from the top corner portion of a pickup truck bed.

6. A bicycle attachment bracket as in claim 2 wherein the releasable cargo attachment end portion carried by an unattached end of the arm comprises a yolk having a strap attached thereto, said strap extending first across and between arms of the yolk, and then outwardly beyond the yolk, so that bicycles having carbon compound frames less like to be broken when held against the strap which adapts to their particular curvature.

7. A bicycle attachment bracket as in claim 6 wherein the yolk is provided with a strap slot, molded from rubber and contoured with a radius chosen for the reception of a bicycle frame.

8. A bicycle attachment bracket as in claim 6 wherein the yolk comprises a metal rod to which a strap is attached through holes therein.

9. A bicycle attachment bracket as in claim 4 wherein the body is fabricated from flat metal having a top portion bent to extend over the top portion of the side of the pickup truck bed, and having a side portion bent to hingably attach the bracket end of the arm thereto.

10. A bicycle attachment bracket as in claim 9 further comprising a stabilization plate, positioned adjacent to one of the sides of the body, and having a central opening therethrough for reception of the shank of the screw used to tighten and hold the body against the channel, said stabilization plate provided for rigidity especially when the channel is spaced substantially below the top side portion of the side of the pickup truck bed.

11. A bicycle attachment bracket as in claim 2 wherein the lug is rectangular having a width which is able to be received through a channel from an inner side portion thereof and a length which can be turned upright within the channel to thereby vertically catch the top and bottom inner side portions of the channel.

12. A bicycle attachment bracket as in claim 11 provided with a central rectangular inward projection for reception within the vertical slot of the body, to thereby ensure maintenance of proper upright orientation of the lug within the channel.

13. A bicycle attachment bracket as in claim 1 wherein the lug comprises a brace adapted to be positioned under, and squeeze against an interior top side corner portion of the pickup truck bed.

14. A bicycle attachment bracket as in claim 13 wherein the screw comprises an eyebolt, having an eye head portion which can be finger held, tightened, and used as a tie down; and further comprising a flat washer positioned over the shank, immediately behind the eye head portion to ensure that when the eye head portion is vertically aligned that it does not drop into, the vertical slot.

15. A method of attaching a bicycle in the bed of a pickup truck having a rail running along an interior side of the bed comprising the steps of:
   a) obtaining two brackets as described in claim 5;
   b) spacing a front and rear bracket positioned along the rail for attachment of a front and rear portion of the frame of the bicycle thereto;
   c) positioning the shank portion of the screws through the body of the bracket adjacent to the interior side of the rail, with the lug positioned in the rail screwed on an end portion of the shank;
   d) mounting the brackets by tightening the screws extending through the body of the brackets, thereby squeezing the rail between the lug and the body of the brackets;
   e) swinging the arm from an upright storage position to a laterally extending in use position;
   f) extending and locking the arm, and arm extension to position each attachment end portion at an appropriate spacing from the interior side wall of the truck bed; and finally,
   g) attaching the front and rear frame of the bicycle to the two attachment brackets;
   thereby securing the bicycle in the bed of the pickup truck.

16. A method of attaching a bicycle in the bed of a pickup truck as in claim 15 further comprising the steps of:
   obtaining two brackets wherein the screw in the brackets obtained comprises an eye bolt;
   mounting each bracket having a top portion of the body of each bracket positioned on the top portion of the side of the pickup truck bed;
   hand tightening the eye bolts thereby squeezing the rail truck between the flat washer under the eye head portion of the eye bolt and the lug, said shank portion extending through the vertical slot.

17. A method of attaching a bicycle in the bed of a pickup truck as in claim 16 further comprising the steps of:
   obtaining two brackets wherein the arm, the arm extension, and the selection and locking means thereof comprise a hollow internally threaded member having a mating externally threaded rod therein, said rod carrying a nut thereon for lockably selecting a selected projected length;
   adjusting the spacing of the cargo attachment end portion an appropriate spacing from the rail by rotating the extension arm within the arm, and then tightening the nut on the threaded rod against the hollow internally threaded member to lock the selected projected length;
   positioning straps through the releasable cargo attachment end portions of the attachment, brackets and around the bicycle frame;
   swinging the arms and the arm extensions from an upright storage position to a lateral operable position; and thereafter,
   tightening the straps to thereby secure the bicycle.

18. A bicycle attachment bracket as in claim 5 wherein the arm, the arm extension, and the selection and locking means together comprise a hollow internally threaded member having a mating externally threaded rod therein, said rod carrying a nut thereon for lockably selecting an attachment bracket spacing after a selected projected length has been attained by rotating the arm extension with respect to the arm.

* * * * *